(No Model.)
I. KITSÉE.
TELEGRAPHY.
No. 550,511. Patented Nov. 26, 1895.
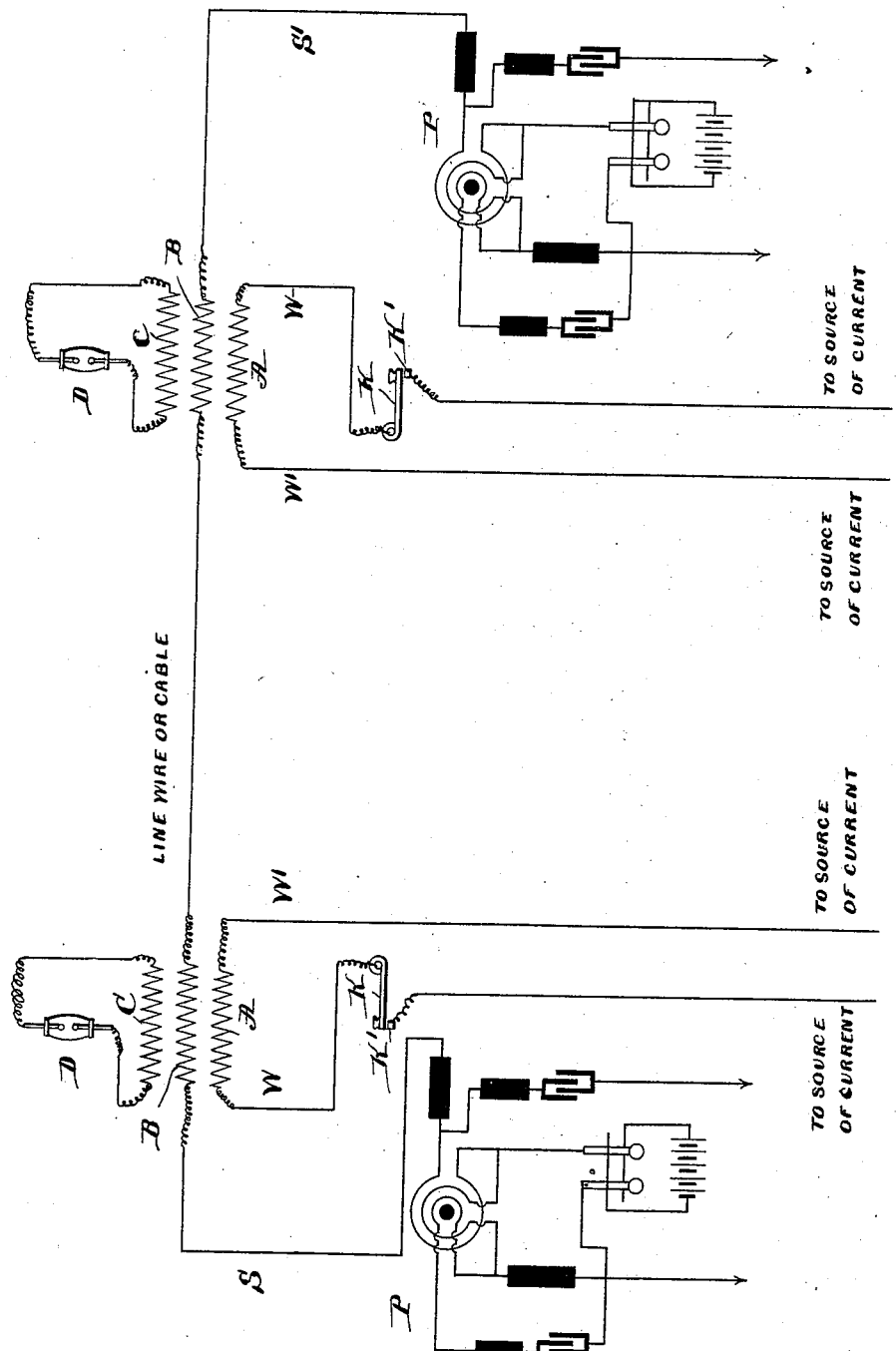
Witnesses. Inventor.

UNITED STATES PATENT OFFICE.

ISIDOR KITSEE, OF PHILADELPHIA, PENNSYLVANIA.

TELEGRAPHY.

SPECIFICATION forming part of Letters Patent No. 550,511, dated November 26, 1895.

Application filed September 7, 1895. Serial No. 561,844. (No model.)

*To all whom it may concern:*

Be it known that I, ISIDOR KITSEE, of Philadelphia, county of Philadelphia, State of Pennsylvania, have invented a new and useful Improvement in Electric Telegraphy, of which the following is a specification.

My invention relates to telegraphic communications with the aid of electric currents. Its object is to increase the capacity of a line-wire or cable by enabling operators to send or receive messages according to my invention at the same time as other messages are transmitted over the line without interfering with these messages.

Referring to the drawings, which illustrate in a diagrammatic view a telegraphic system embodying my invention, the line-wire or cable connects the two stations S and S' with each other. Each of these stations is provided with the usual sending, receiving, and other necessary instruments. Each station is also provided with my sending and receiving devices. The first or sender consists, as illustrated, of a converting device having three coils, A B C, respectively.

A is the primary coil, having connected thereto the key with its movable lever K and stationary contact K'. This coil is connected by wires W and W' to a source of electricity. The secondary coil B is inserted in (connected in series to) the line-wire or cable. The tertiary coil C is connected to the vacuum-tube D.

If the wires W and W' are connected to batteries or other straight-current generators, a vibrator or pole-changer has to be placed in the circuit between coil A and source of electricity; but if said source is a generator of alternating impulses the vibrator or pole-changer is, as is apparent to all who are versed in the art, not necessary.

In the drawings the usual receiving and sending instruments are designated by the letters P P'. I have shown the same as adapted to submarine cables; but it is obvious that other instruments or sets of instruments or other necessary appliances may be added or substituted for the one illustrated.

As illustrated, each converting device consists of three coils. The reason for this arrangement is the following: One of three methods can be adopted in carrying out that part of my invention which has for its object the sending of messages.

First. The primary coil of a converter can be connected to a source of electricity and line-wire, respectively, and the primary impulses sent over the line, and then with the aid of a localized secondary and vacuum-tube locally converted into the necessary high tension and glow; but such arrangement necessitates the employment of rheostats, balances, and other devices, the employment of which should be obviated, if possible.

Second. The secondary coil of the converter can be inserted in the line-wire. This would obviate the question of connection; but as the impulses, especially if the same should be received as a glow with the aid of a vacuum-tube, have to be of very high pressure the frequent supports of a land-line or the comparative small insulating space of a submarine cable may not sufficiently prevent the escape of the electric energy.

The third method—the one illustrated and preferred—is to first send through a localized primary rapidly recurring or alternating impulses, then to translate the same in and with the aid of a secondary coil connected in series to the line-wire or cable, thereby sending the so-translated impulses over the line-wire or cable. These secondary impulses should be of lower intensity than is necessary for the glow of the vacuum-space.

The *modus operandi* for sending and receiving messages is a very simple one. At the sending-station the operator connects coil A through his sending-key with the source of electricity. With the aid of this key he sends through the coil (the primary) currents of electricity. These impulses in A, which are recurring or alternating, induce impulses in B corresponding in time to the time of the flow of impulses in A. It has to be understood that the operator in closing and opening the key once does not send only one impulse through A, but a series of such impulses, the flow-time of which corresponds with the closing-time of the key, a dot with its short closing-time sending impulses through A for a shorter period than a dash with its longer closing-time. As far, therefore, as the operator is concerned, he has to manipulate the key as if the current-flow is a straight and not an interrupted or alternating one. As said above, the recurring or alternating impulses in A induce alternating impulses in B. These impulses travel over the line-wire or cable and the coil inserted in the line at the receiving-station. We therefore have as a result of the sending of a message traveling over the line rapidly-alternating impulses of such small ampèrage that the other sending or receiving instruments, depending, as they do, on the movement of the armature of an electro-magnetic device, cannot respond and remain practically unaffected by the flow of these impulses. As around each of the coils B—sending as well as receiving station—the tertiary coil C is wound, it follows that the alternating impulses traveling through B will induce alternating impulses in C, and as the coils are wound to the necessary high potential the generated tertiary impulses will, if the terminals of the coil are connected to a vacuum tube or device similar in its action, produce in said tube or similar device a glow corresponding in time to the time of the electric impulses generated through induction—shorter glow-time for dot and longer glow-time for dash.

Having now described my invention, what I claim as new, and desire to secure by Letters Patent, is—

1. In telegraphy a sending instrument consisting of the primary and secondary coil of a converter, the primary coil being localized a converter, and the secondary coil connected to the line-wire, and a receiving instrument consisting of the secondary and tertiary coil of a converter the secondary coil being connected to the line-wire and the tertiary coil being locally connected to a vacuum-tube or a device similar in its action.

2. In a system of electric communications two or more stations connected together by line-wire or cable each being provided with the usual sending and receiving instruments and also with a source of rapidly recurring or alternating impulses for sending, and a vacuum-tube or similar instrument for receiving.

3. A system of electric communications consisting of a line-wire or cable provided as to each of its terminals with the usual sending or receiving instruments or both and also with a source of localized rapidly recurring or alternating electric impulses, a converting coil inserted into the line-wire or cable and a vacuum tube connected to a third localized coil, in proximity to the second coil.

4. A system of electric communications consisting of a metallic line connecting one or more sending and one or more receiving stations, the sending stations being provided each with a source of rapidly recurring or alternating impulses and a sending-key, the receiving-stations being provided with a vacuum-device as a receiver.

In testimony whereof I have signed my name to this specification, in the presence of two subscribing witnesses, this 6th day of September, 1895.

ISIDOR KITSEE.

Witnesses:
   WALLACE B. ELDRIDGE,
   JESSE B. HELLER.